Aug. 15, 1939.    N. M. McCULLOUGH    2,169,268
SPEEDOMETER VEHICLE SPEED CONTROL DEVICE
Filed Sept. 14, 1936
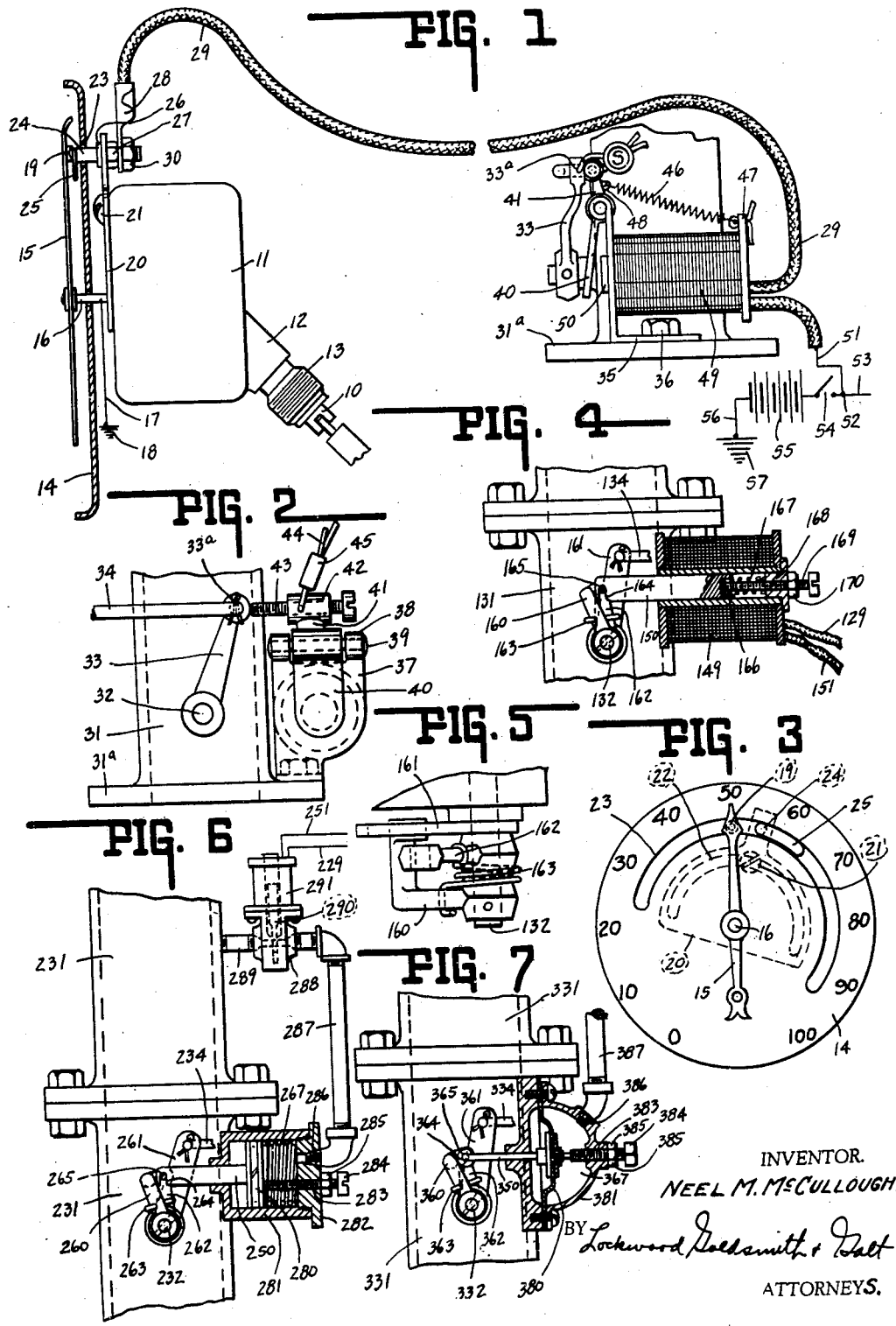
INVENTOR.
NEEL M. McCULLOUGH.
BY Lockwood Goldsmith & Galt
ATTORNEYS.

Patented Aug. 15, 1939

2,169,268

UNITED STATES PATENT OFFICE 2,169,268

SPEEDOMETER VEHICLE SPEED CONTROL DEVICE

Neel M. McCullough, Anderson, Ind., assignor to Pierce-Governor Company, Anderson, Ind., a corporation Application September 14, 1936, Serial No. 100,650

2 Claims. (Cl. 125—355)

This invention relates to means responsible to vehicle speed for limiting the speed of an engine of a self-propelled vehicle to prevent overspeeding of the vehicle, as distinguished from regulating the speed of a vehicle through regulating the speed of an engine by means responsive to the speed of an engine.

The chief object of the invention, as indicated by the foregoing, is to permit the engine to operate at what might be termed normal overspeed under conditions where such engine overspeeding does not result in vehicle overspeeding.

Several forms of the broad invention are illustrated herein. Each form illustrated has the characteristic that the engine control means is electrically operable and is also responsive to the speed of the vehicle at critical speeds for controlling the speed of the engine of the vehicle, preferably by controlling the fuel supply valve, fuel supply lever, et cetera, of the fuel supply system.

This application is a continuation in part of the copending applications entitled Vehicle speed engine limiting device, filed July 17, 1936, Serial No. 91,213 and Pressure operable governor actuated vehicle speed control, filed August 1, 1936, Serial No. 93,800, although the latter is more closely related to the former than it is to the present application.

The chief distinguishing characteristic embodied herein is a circuit control responsive to the vehicle speedometer, adjustable as desired or required, and controlling the fuel control system.

Other objects and features of the invention will be understood from the accompanying drawing and the following description and claims:

In the drawing,

Fig. 1 is a diagrammatic representation of the major portion of one form of the invention, the electric operable control for the engine and the speedometer operable switch being shown in elevation, a part of the vehicle being shown in section.

Fig. 2 is a side elevation of the electric operable control for the engine.

Fig. 3 is a front view of the speedometer and associated switch.

Fig. 4 is an elevational view, parts being broken away to show other parts in central section and of another form of engine control responsive to the vehicle speed control.

Fig. 5 is a plan view of the engine fuel valve lever arm actuating mechanism shown in Fig. 4 and in subsequent figures.

Fig. 6 is a view similar to Fig. 4 and of a modified form of the invention.

Fig. 7 is a view similar to Figs. 4 and 6 and of another modified form of the invention.

In Figs. 1 and 3 of the drawing, 10 indicates a shaft constituting a part of the speedometer drive. Said shaft rotates at a speed proportional to the vehicle speed. The speedometer housing 11 includes an extension 12 threaded as at 13 for detachable connection to an arrangement wherein there is enclosed a shaft cooperating with shaft 10 for operating the speedometer mechanism. The speedometer mechanism also includes the dial or a face plate 14 and an indicating device, such as a needle 15, carried by the speedometer needle shaft 16 operated by the mechanism enclosed within the housing 11.

Herein the speedometer needle shaft is grounded by a line 17 as at 18. Usually this connection is the normal grounding of the vehicle electrical system. The needle or pointer 15 has suitably secured to it a switch contact 19. The dial has the usual miles-per-hour designations thereon or other equivalent designations.

Pivotally supported coaxial with the speedometer needle shaft 17 is a plate 20 and the same is rigidly adjusted arcuately with respect to the predetermined desired regulating speed and is secured in the associated position by means of the screw 21 which extends through the arcuate slot 22, see Fig. 3, and clamps the plate 20 to the speedometer housing. The arcuate slot 22 is concentric with the pivotal axis. The dial also includes an arcuate slot 23 and projecting therethrough is an electrical conductor 24 which terminates in an arcuate extension 25. The member 24 is insulatably supported as at 26 and 27 by the plate 20 and the projecting end of the member 24 is in electrical connection as at 28 with a wire enclosed within insulation, both being generally indicated by the numeral 29 in Fig. 1. The terminal member 28 thereof is secured in electrical and mechanical connection through the nut 30.

It will be quite obvious from the foregoing that the screw 21 may be sufficiently released to arcuately adjust the plate 20 to the desired position so that the position of member 24 corresponds to the predetermined desired speed indication on the speedometer dial. The screw 21 is then tightened and the mechanism is thereby set for the predetermined critical vehicle speed. (The switch adjustment is preferably sealed against tampering, although such sealing is not shown herein.)

As the speedometer needle rises from zero to the higher speeds, the fuel control arrangement and speedometer control is such that it is ineffective, due to the fact that the contact 19 on the speedometer needle 15 does not engage the approach side of contact 25.

The reason for providing an elongated contact 25 is that there is not only a time lag in the electrical operation,—this being quite minor,—but there is an appreciable time lag in the fuel control operation,—that is, before the fuel control really becomes effective for engine control. For that reason, the elongated contact 25 is provided so that the instant the vehicle speed is that of the critical speed, th initial closure of the control is made, and this closed circuit condition is the critical speed, the initial closure of the continue its acceleration, by reason of engine acceleration, etc., for a very slight period. It will be apparent, if this elongated contact, or some other maintaining circuit control arrangement, were not provided, that the speedometer needle might pass beyond the position of member 24 and thus release the fuel control mechanism from the electrical control, and thus defeat the purpose of the invention, which is to prevent overspeeding of the vehicle but to permit normal overspeeding of the engine at such times as the vehicle, by reason of such overspeeding or acceleration, does not have a speed greater than the critical predetermined vehicle speed.

Reference will now be had to Figs. 1 and 2 of the drawing wherein a simple form of invention is illustrated. In this form of the invention, 31 indicates a portion of the fuel supply passage to the engine. A shaft 32 supports a valve in said passage. Shaft 32 mounts a lever arm 33 which is connected to an actuating rod 34. This constitutes a manual throttle, either foot or hand operable, or foot and hand operable.

The fuel control mechanism shown in Figs. 1 and 2 more specifically, includes a supporting base 35 secured as at 36 to a fuel supply structure 31, and more specifically the flange 31a thereof, and the bracket extension 37 is bifurcated, see Fig. 2, and each end terminates in the pivotal support 38 which is in line with pivot 39. Pivotally supported on member 38 is an armature 40 and an arm 41, having threaded portion 42, which adjustably mounts a stop 43 in the form of a bolt. A sealing wire 44 and a metal seal suitably secure the bolt 43 and its anchorage 42 in sealed relation,—that is, after being sealed, the bolt cannot be adjusted in its anchorage relative to the keeper or armature without destroying the seal. A spring 46 is suitably secured to a member 47 at one end and to an anchorage 48 on the arm 41. A solenoid magnet 49 has a core 50. A wire 51 is connected as at 52 to a line 53 which includes a switch 54. Line 53 is connected to one terminal of the battery 55. The other terminal of the battery is connected by a terminal 56 to a line 57. The switch 54 diagrammatically represents the main switch, such as the ignition switch of the internal combustion engine of a vehicle. Line 53 is the main line to the ignition system, line 51 being a branch thereof to the solenoid. The circuit is completed through the speedometer switch and the ground 18.

When the circuit is completed through the solenoid magnet, the armature 40 is moved counterclockwise and to the right in Fig. 1, which tilts the bolt counterclockwise and to the left in Fig. 1 and positions the bolt in alignment with the connecting portion 33a of the throttle lever in the clockwise direction. As long as the solenoid is actuated, which will be as long as the ignition is turned on and the vehicle is overspeeding or running at the critical speed, the bolt 43 is in throttle stopping position and prevents further fuel supply necessary to run the vehicle on the level and under normal conditions at the critical speed. Should the vehicle overspeed, the stop will still remain effective so far as fuel control is concerned. Should the vehicle speed fall due to climbing a hill or the like, the speedometer switch circuit will be opened, the spring retracts the stop from stopping position and then the operator is permitted to advance the lever 33 in clockwise direction beyond the position shown in Fig. 2.

Fig. 4 shows another form of the invention. In this figure, 131 indicates a fuel supply passage to an engine. One circuit wire is indicated by 129 and 151 indicates another circuit wire to a solenoid 149 having an actuating member or movable core 150. The lines 129 and 151 are associated with the ignition system of the vehicle and a speedometer switch arrangement as illustrated in Fig. 1.

Reference will now be had to Fig. 5. Shaft 132 has pinned to it at its outer end an angular stop 160. Between stop 160 and the lever arm 161 is another arm 162 which is free on the shaft 132 but is held against the stop 160 by the spring 163. The rod or member 150 is notched as at 164 to receive a pin 165 carried by the arm 162. The rod 150 terminates in a recessed end 166 which nests one end of a coil spring 167 that bears against member 168 threaded to receive an adjustable stop in the form of a bolt 169 locked in adjusted position by the nut 170.

Normally, spring 167 projects the movable core to the left in Fig. 4 and this corresponds to a position wherein the speedometer switch control is non-controlling. Upon energization of the solenoid 149, the movable core is moved to the right in opposition to the spring 167 and the fuel control mechanism, including a valve, not shown, included within the passage 131, is moved to the right and fuel controlling position until the member 150 engages the stop 169 and the parts are held in this position as long as the solenoid is energized. In this manner, the speed of the vehicle is controlled by controlling the supply of fuel to the engine.

In Fig. 6, a modified form of the invention is illustrated. In this form of the invention numerals of the 200 series indicate like or similar parts bearing numerals of the 100 series in Figs. 4 and 5. The fuel supply passage is indicated by 231, fuel supply control shaft by 232, stop by 260, associating spring by 263, lever arm by 262, the operating lever by 261, manual control rod by 234 and the solenoid controlled actuating member by 250, notched as at 264 for association with pin 265 carried by member 262.

Member 250 in this instance is a piston rod carried by the piston 280 reciprocally mounted in cylinder 281 suitably supported adjacent the fuel supply passage 231. The head 282 of the cylinder is threaded as at 283 to support an adjustable stop 284 in the form of a bolt locked in adjusted position by nut 285. The piston is normally maintained in a position to the extreme left of the cylinder by means of the spring 267. The head of the cylinder includes an opening 286 connected by conduit 287 to a valve 288 in turn connected as at 289 to the intake or fuel supply portion of the engine. The vehicle body 288 includes therein a valve member 290 operated by solenoid 291, the supply lines 251 and 229.

When the speedometer switch is closed, the valve is actuated so that the vacuum in the intake passage 231 is applied through lines 289 and 287 to the cylinder 281 and the piston is drawn from its extreme left hand position to the right until it engages the adjustable stop 289 and this is in opposition to spring 267. This control actuates the fuel controlling shaft 232 and the speed of the engine cannot increase, even though the operator may attempt to manually supply fuel.

Fig. 7 shows a slightly different modified form of the invention. The solenoid operable valve shown in Fig. 6 is omitted, likewise the speedometer switch, but both are actually used in substantially the same relation as has been hereinbefore set forth. This form of the invention differs from that shown in Fig. 6 only in the substitution of a diaphragm power member in place of a piston power member.

In such installations wherein there is a source of compressed air available which now is the common standard practice for braking purposes in trucks, it is to be understood that the piston or diaphragm shown in Figs. 6 and 7 may be associated with the supply of compressed air so that the piston or diaphragm will be moved to the right upon opening of a valve in a supply line from the air pressure reservoir to the cylinder or diaphragm chamber. The piston and diaphragm are moved substantially as before described by the compressed air in opposition to the returning springs illustrated therein. The solenoid operable valve in this instance, however, or by the addition of equivalent means, automatically bleeds the piston or diaphragm chamber respectively from the compressed air to permit said springs to become operative when the solenoid is deenergized.

The aforesaid modifications are so obvious to the persons skilled in this art that the same are not illustrated. Thus, the modifications illustrated herein, while shown specifically applied to a vacuum system, are also applicable with slight changes to a pressure system without departing from the invention.

While the invention has been described in great detail in the foregoing specification and several modifications have been illustrated and described, such illustrations and detailed descriptions are considered to be illustrative and not restrictive in character. The several modifications illustrated and described, as well as others hereinbefore mentioned, together with others which will readily suggest themselves to persons skilled in this art are all considered to be within the broad scope of the invention, reference being had to the appended claims.

The invention claimed is:

1. In a control structure, the combination with a speedometer having a speed responsive indicator movable proportional to vehicle speed, a relatively stationary dial, and a housing for indicator operating means, of a support arcuately adjustable on the housing upon an axis coincident with the axis of indicator movement, an angular member carried thereby, the dial having an elongated, coaxial, arcuate slot therein through which one portion of the member projects toward the indicator, another portion of the angular member lying parallel to the dial and between the same and the indicator for latter engagement when the indicator is moved into registration therewith, the said second mentioned portion of the angular member being elongated arcuately and coaxially with reference to the indicator axis, and means securing the support to the housing in the adjusted position.

2. A structure as defined by claim 1, characterized by the support and angular member having an insulated relationship therebetween.

NEEL M. McCULLOUGH.